No. 40,808. PATENTED DEC. 8, 1863.
W. H. BAKER.
TELESCOPE.
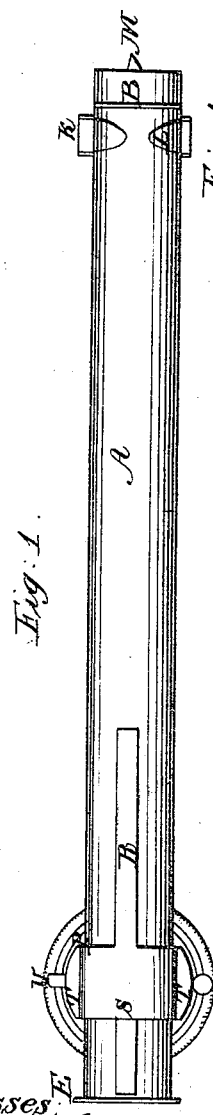
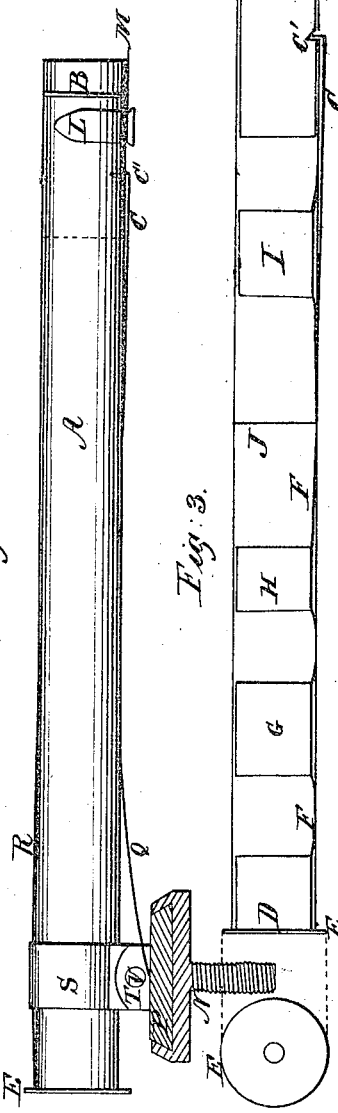
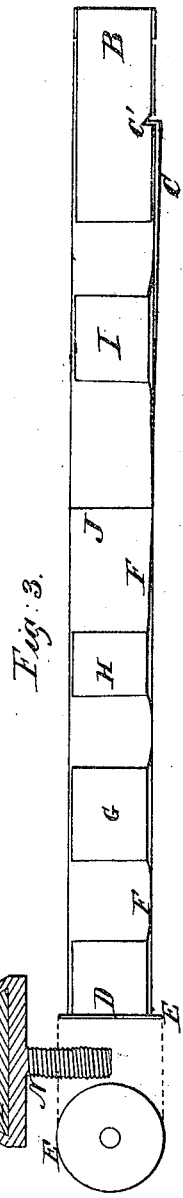
Witnesses,
Inventor,

UNITED STATES PATENT OFFICE.

WILLIAM H. BAKER, OF MARATHON, NEW YORK.

IMPROVEMENT IN TELESCOPES.

Specification forming part of Letters Patent No. 40,808, dated December 8, 1863.

*To all whom it may concern:*

Be it known that I, WILLIAM H. BAKER, of Marathon, in the county of Cortlandt and State of New York, have invented certain new and useful Improvements in Telescopes; and I do hereby declare that the same are described and represented in the following specifications and drawings.

To enable others skilled in the art to make and use my improvements, I will proceed to describe their construction and use, referring to the drawings, in which the same letters indicate like parts in each of the figures.

Figure 1 is a plan of a telescope with my improvements. Fig. 2 is a side elevation of the same. Fig. 3 shows the settings of the lenses and diaphragm. Fig. 4 is an end elevation of the setting of the object-glass.

The nature of my invention and improvements in telescopes consists in supporting the lenses or their settings and diaphragm which compose the eye-piece by fastening such settings or lenses to a serpentine spring or springs, thereby making a fastening that may be more readily removed and render the lenses less liable to work loose or be broken by any jar or concussion to which they are exposed in use when applied to fire-arms or otherwise; and in securing the setting of the object-lens in the tube of the telescope by means of a spring working through the tube into the setting of the lens, and in a spring-clasp to hold the face end of the telescope to the barrel of the gun; also in the peculiar construction and arrangement of devices for fastening the rear end of the telescope to a gun and adjusting the telescope on it, the object of my improvements being to make a telescope that can be more easily taken apart and cleaned and repaired and put together again with greater facility than any heretofore made, and at the same time secure fastenings which will resist the concussions to which the telescope is exposed when applied to fire-arms.

In the accompanying drawings, A is the tube of the telescope, and B the setting of the object-lens fitted to the tube and extending a short distance into the tube, and provided with a notch, C', for the end of the spring c, which is fastened to the outside of the tube with one end working through a hole in the tube and into the notch C' in the setting B, to hold it in. The setting may be withdrawn by turning it, so as to force the spring back out of the notch in the setting.

D is the setting of the eye-piece, provided with a flange, E. This setting D is fastened to the serpentine spring F, to which spring the several settings, G, H, and I are fastened, and also the diaphragm J. These settings are all made a little smaller than the tube and fastened to the elevations on the spring F, which presses them against the side of the tube opposite to that on which the spring rests, as shown in Fig. 3. When the settings of the lenses are supported by a spring, as above mentioned, they are less liable to be broken by any sudden jar or concussion when the telescope is in use. Besides the friction from the pressure of the spring holds them in the tube, and they may be easily withdrawn and repaired or cleaned and inserted again with the greatest facility.

Although my improvement may be used to advantage in telescopes for any purpose, they are especially adapted to telescopes for rifles and other fire-arms, to which they may be fastened by my improved devices, viz:

K is a slide made dovetailing, to be adjusted in a dovetailing score on the barrel of the rifle. To this slide K the C-spring L is fastened to hold the face end of the telescope by clasping it firmly. On the side of the spring L there is an index-point, M, projecting beyond the end of the telescope for the purpose of setting the slide and telescope laterally by the graduated scale on the barrel of the rifle.

N is an adjusting-screw to work in a female screw in the barrel or some other part of the rifle, and the head of this screw is a socket turning on the disk P, the flange of the socket projecting over the edge of the disk to hold it in the socket.

The spring Q is fastened to the under side of the tube A, with one end resting on the disk P, and the spring R is fastened on the top of the tube A opposite to the spring Q. This spring is also fastened to the strap S, which passes over the tube A, and its ends pass down inside of the ears T T on the disk P, and the pin V passes through the ears and the ends of the strap S to hold or fasten the telescope to the disk P while it is supported by the springs Q and R, as shown in Fig. 2. The disk P and socket which surrounds it are shown in section in Fig. 2, and the outer edge of the socket is milled, so that the screw N may be readily turned with the thumb and finger to adjust the telescope, and by drawing the pin V the telescope may be removed from the gun.

I have described the settings of the lenses as being fastened to a single serpentine spring, but I contemplate that another similar spring may be fastened to the opposite sides of the settings; and in large telescopes three or four springs may be used; also that my telescope may be provided with spider-lines in the usual manner or otherwise.

I believe I have described and represented my improvements in telescopes so as to enable any person skilled in the art to make and use them without further invention or experiment. I will now state what I desire to secure by Letters Patent.

I claim—

1. Supporting the lenses or their settings and diaphragm which compose the eye-piece of the telescope by means of a spring or springs, thereby making a fastening that may be more readily removed and render the lenses less liable to work loose or be broken by the jar or concussion to which they are exposed in use.

2. The notch C' in the setting of the object-lens, in combination with the spring on the tube, which holds the setting in and prevents it from working out by the recoil of the gun when it is fired.

3. The spring-clasp for holding the fore end of the telescope to the barrel of the gun.

4. Securing the disk P to the adjusting-screw by turning the edge of the socket over the edge of the disk, as described.

5. Fastening the telescope to the disk P by means of the ears T T, strap S, and pin R, in combination with the spring or springs between the disk and telescope and between the telescope and strap S.

WM. H. BAKER.

Witnesses:
P. C. GRAY,
LYMAN ADAMS.